3,349,144
ALKYL ARYL PROCESS
Husni R. Alul, Olivette, and Sidney G. Clark and Gilbert J. McEwan, St. Louis, Mo., assignors to Monsanto Company, St. Louis, Mo., a corporation of Delaware
No Drawing. Filed Sept. 25, 1964, Ser. No. 399,379
8 Claims. (Cl. 260—671)

This invention relates to an improved process for the manufacture of a specific type of alkyl aryl compounds, that is, the manufacture of straight chain alkyl aryl compounds suitable for use in the production of biodegradable detergent products, and is more particularly concerned with improving the process of alkylating aromatic compounds with a specific type of alkylating material using hydrogen fluoride as the catalyst, as well as the quality of the products produced thereby.

Straight chain alkyl aryl compounds and particularly straight chain alkyl benzene sulfonates are becoming increasingly more important as surfactants in commercial detergent products because of, among other things, their ease of biodegradation. These alkyl benzene sulfonates can be prepared conveniently by alkylating benzene with high molecular weight straight chain mono-olefins in the presence of hydrogen fluoride as the catalyst followed by sulfonation and neutralization. Straight chain mono-olefins, however, are not easy to obtain especially at prices corresponding to tetrapropylene olefins (highly branched chain olefins) which are now customarily used in producing non-biodegradable alkyl benzene sulfonates. Among the methods which can be used to obtain the straight chain mono-olefins, one method which appears to be advantageous because of, among other things, its versatility in that it permits various adaptations to be practiced, is the separation and recovery of high molecular weight straight chain paraffins from such sources as kerosene petroleum fractions by such methods as the use of urea adduction and molecular sieves. The straight chain paraffins can then be dehydrogenated over a suitable catalyst to form straight chain mono-olefins. Because of, among other things, process conditions used, a mixture is obtained containing the desired straight chain mono-olefins and the unreacted straight chain paraffins. Rather than separating the straight chain olefins from the straight chain paraffins, which is at best difficult and expensive to achieve, the mixture in most instances can be passed to the alkylation unit wherein the straight chain mono-olefins can be used to alkylate benzene to form the desired straight chain alkylbenzene compounds and the unreacted straight chain paraffins can be readily separated therefrom by such procedures as distillation.

A particular problem which is presented by the foregoing is the high fluoride impurity content of the straight chain paraffins which are separated from the desired alkylbenzene products after the alkylation reaction. In order to recycle these paraffins back for reuse in the dehydrogenation process the fluoride impurities must be reduced to acceptable levels because of their tendency at higher levels to interfere with the dehydrogenation process by poisoning the catalyst and the like. As can be appreciated, a simple and inexpensive means for reducing the fluoride impurity content of the recycle straight chain paraffins and, more particularly, to reduce the fluoride impurities to acceptable levels would be extremely desirable and would represent an advancement in this art.

Therefore, it is an object of this invention to provide an improved process for producing straight chain alkyl aryl compounds suitable for use in the production of biodegradable detergents.

It is another object of this invention to provide a process for reducing the fluoride impurity content of recycle straight chain paraffins which are recovered as unreacted products from the alkylation of aromatic compounds with a mixture containing straight chain mono-olefins and straight chain paraffins using hydrogen fluoride as the alkylation catalyst.

It is a still further object of this invention to provide a process for producing straight chain alkyl aryl compounds with improved quality suitable for use in the production of biodegradable detergents.

Other objects will become apparent from a reading of the following detailed description and claims.

It has now been found that the fluoride impurity content of the unreacted straight chain paraffins can be reduced as well as the quality of the straight chain alkyl benzene compounds improved in the alkylation of benzene with straight chain mono-olefins contained in an alkylate precursor mixture, obtained by catalytic dehydrogenation of straight chain paraffins, using substantially anhydrous hydrogen fluoride as the alkylation catalyst by carrying out the alkylation at temperatures from about 35° C. to about 65° C., all of which will be more fully discussed hereinafter. Substantially anhydrous hydrogen fluoride as used herein refers to hydrogen fluoride containing less than about 10% by weight of water. It has been unexpectedly found that when conducting the alkylation reactions at these elevated temperatures not only does the yield of the desired alkylbenzenes remain as high as that obtained using lower conventional temperatures but, in addition, the fluoride impurity content of the unreacted paraffins and the desired alkyl benzene products are substantially reduced as well as the bromine number of the resulting alkyl benzene. The bromine number is a convenient indicia for the quality and color of the resulting detergent product and a low bromine number indicates a high quality product.

Since alkylbenzene is most commonly used in the preparation of detergents, the instant invention is disclosed with reference to a process for the manufacture of those products, although it will be apparent that it may be equally advantageously employed to prepare other alkyl aryl compounds. For example, the hydroxy substituted and mono- and di-lower alkyl substituted (1 to 4 carbon atoms) monocyclic aromatic compounds, such as phenol, toluene and xylene as well as the dicyclic aromatic compounds such as naphthalene, are exemplary but not limitative of the aromatic compounds which are suitable for use in the invention.

The high molecular weight straight chain paraffins can vary in chain length and, in general, paraffins from about 6 to about 20 carbon atoms are preferred and can be the relatively pure paraffins, such as dodecane, tetradecane and the like, but usually is a mixture of straight chain paraffins, such as the $C_{10}$–$C_{15}$ mixture averaging from about 12 to 14 carbon atoms per molecule.

As previously mentioned, convenient methods for obtaining the straight chain paraffins is by their separation from hydrocarbon mixtures containing, in addition to the paraffins, such materials as branched chain or isoparaffins and cycloparaffins by the method of adsorption-desorption processes using molecular sieves as the selective adsorbent or using urea-adductions techniques.

The foregoing hydrocarbon mixtures containing the desired straight chain paraffins can be conveniently obtained from such sources as a straight run petroleum distillate fraction having a boiling point between about 170 and 240° C., i.e. kerosene, Fischer-Tropsch reaction products which process entails the hydrogenation of carbon monoxide in the presence of a catalyst of a metal of the iron group as well as other hydrocarbon mixtures containing such paraffins.

The improved alkyl benzene compounds are prepared by the catalytic dehydrogenation of straight chain paraffins to form straight chain mono-olefins having the same chain length as the straight chain paraffins followed by the alkylation of benzene with the straight chain mono-olefins in the presence of substantially anhydrous hydrogen fluoride as the catalyst under alkylation conditions as specified herein.

Catalysts which are suitable for use in the dehydrogenation of straight chain paraffins to form alkylate precursor mixtures containing straight chain monoolefins and straight chain paraffins comprise refractory spacing agents or carriers selected from the group consisting of activated alumina, magnesia, silica and diatamaceous earth and minor amounts of the metals and/or metallic oxides of elements selected from members of the left hand columns of Groups IV, V and VI, Group VIII, and the right hand column of Group I of the Periodic Table and include titanium, zirconium, cerium, hafnium, and thorium; vanadium, columbium, and tantalum; chromium, molybdenum, tungsten, and uranium; iron, cobalt, nickel, platinum, palladium, copper, silver, and the like, including mixtures of the foregoing.

The dehydrogenation catalysts are normally utilized at temperatures within the approximate range of from about 400 to about 650° C. at atmospheric or superatmospheric pressures up to approximately 10 atmospheres and at an hourly liquid space velocity, that is, the volume of liquid paraffins contained in the feed to the reactor per hour divided by the superficial volume of catalyst in feed reactor, of from about 0.1 to about 10. Conversion of the paraffins to mono-olefins are generally in minor amounts, that is, less than 50 weight percent per pass, with usually amounts of approximately 5 to 30 weight percent per pass, although in some cases higher conversions can be obtained by properly selecting conditions from the above designated ranges. The time of contact employed will vary greatly with the catalyst used, the temperature of operation employed and other factors, such as the time required for activation or reactivation of the catalyst by removal of the carbonaceous deposits thereon formed during the dehydrogenation reaction.

The difficulty in separating the straight chain mono-olefins from the alkylate precursor mixture containing the paraffins and olefins obtained from the dehydrogenation reaction can be greatly reduced or eliminated as well as economizing the overall process by using the alkylate precursor mixture in the alkylation reaction, i.e., alkylating the benzene with the mono-olefin in the alkylate precursor mixture to form the desired alkyl benzene products and removing the paraffins therefrom for reuse by simple procedures such as distillation if the straight chain paraffins have chain lengths which do not vary over about 5 carbon atoms.

In general, alkylation conditions, other than temperature, which are suitable for normal hydrogen fluoride catalyst alkylations are suitable for use in practicing the present invention. In most cases, the olefin to catalyst molar ratio ranges from about 1:5 to about 1:25 with about 1:15 to 1:20 being preferred and the benzene to olefin molar ratio preferably ranges from about 3:1 to 20:1, although benzene in excess of the 20:1 ratio may be used. The sojourn, that is the time period inclusive of the addition of the reactants and the catalyst into the reaction zone to the termination of the alkylation reaction, is usually about 10 to 60 minutes although as little as 5 minutes may sometimes be sufficient depending upon process conditions used.

The alkylation reaction should be carried out at temperatures from about 35° C. to about 65° C. and preferably from about 50° to 55° C. Superatmospheric pressures sufficient to maintain the catalyst and reactants in the liquid phase are maintained during the alkylation reaction and such pressures are dependent upon reactants used and conditions maintained in the alkylation reaction and, in general, are usually no greater than about 100 atmospheres. As previously mentioned, when conducting the alkylation reaction at temperatures above about 35° C., not only does the yield of the desired alkyl benzenes remain as high as that obtained using lower conventional temperatures, that is, 0° C. to 10° C., but, in addition, the fluoride impurity content of the unreacted paraffins and the desired alkyl benzene products are reduced to acceptable levels thereby allowing the recycle of the paraffins for reuse in the dehydrogenation process. Acceptable levels of fluoride content for the recycle paraffins are usually those below about 1 p.p.m. Additionally the bromine number of the desired alkyl benzenes is substantially reduced thereby resulting in a product having an acceptable quality, that is, a bromine number below about 0.1, and, in many cases, a bromine number below about 0.05 which is considered very good. Temperatures above about 65° C. are not considered advantageous due to, among other things, deleterious effects such as corrosion problems with respect to the alkylation equipment and the like.

After the alkylation reaction has been completed to the extent desired, the catalyst phase is usually separated and the reaction products and unreacted reactants are fractionally distilled in order to separate the desired alkylbenzene products from the undesired by-products and unreacted reactants such as paraffins and benzenes. The paraffins can be returned to the dehydrogenation process step for further conversion to mono-olefins and the benzenes can be returned to the alkylation process step for further conversion to alkyl benzenes. In some cases it may be necessary to further treat the alkyl benzene products in order to improve their purity such as by washing with an acid, such as sulfuric acid and/or caustic. There are many different methods and process conditions for recovering the desired alkylbenzene products from the reaction zone which, in general, are directed to the immediately foregoing processing steps, and, in general, any of the conventional type methods can be used and the conditions necessary for such methods are well-known to those skilled in the art of alkylation hydrocarbons and can be readily determined.

The alkylbenzene compounds can be sulfonated with any suitable sulfonating agent, such as $SO_3$, mixtures of $SO_2$ and $SO_3$, chloro-sulfonic acid, concentrated $H_2SO_4$ or oleum and the like, in the ratio of about 1 to 10 moles of acid per mole of alkyl benzene. Thorough agitation should be provided at temperatures from about 90° F. to about 140° F., and local overheating should be avoided to minimize or prevent side reactions during sulfonation. The spent acid layer can be separated from the sulfonic acids by stratification either with or without addition of water and the acid discarded.

The sulfonated alkyl benzene compounds are then neutralized with a caustic alkali solution in order to form the sodium salt of alkyl benzene sulfonic acid and dried to obtain the desired sodium alkyl benzene sulfonate surfactant.

The following example is presented to illustrate the invention with parts and percentages by weight being used in the example unless otherwise indicated.

EXAMPLE

The alkylation reactions were carried out in an alkylator equipped with a stirrer, thermocouple, cooling coil and sample port. The alkylate precursor mixture, that is, a mixture containing straight chain mono-olefins having chain lengths from about 10 to 15 carbons atoms, had the following approximate composition:

| | Percent |
|---|---|
| Mono-olefins | 12–13 |
| Di-olefins | 1–2 |
| Tri-olefins and aromatics | 3–5 |
| Paraffins, balance. | |

The alkylate precursor mixture was added to the benzene and hydrogen fluoride over a period of about 5 to 10 minutes while the mixture was maintained at the indicated temperatures. The reaction mixture was stirred at such temperature for an additional 20 minutes, then allowed to settle. The catalyst phase separated as a lower layer from the alkylated liquor phase and was removed therefrom. A molar ratio of benzene to olefin of about 6:1 and a molar ratio of HF to olefin of about 18:1 were used for all alkylations. The alkylated liquor was then fractionally distilled at about 80° C. to 100° C. (overhead temperature) to remove unreacted benzene and HF, at about 130° C. to about 140° C. at about 20 mm. Hg to remove unreacted paraffin, at about 135–150° C. at about 20 mm. Hg to remove a fraction called light aromatic naphtha and at about 110–170° C. at about 2 mm. Hg to remove the desired alkylbenzene product from the residue.

The bromine number for the alkylbenzene product was then determined by the following procedure: a 10 cc. sample of the alkylbenzene is dissolved in 50 cc. of glacial acetic acid, 1 cc. of a (KBr—KBrO$_3$) solution is approximately .5 normality is added thereto, and the mixture is shaken. About 5 cc. of 15% KI solution is then added thereto and the liberated iodine is titrated with standard thiosulfate solution. The bromine number of the sample is calculated from the following: bromine number =.92× milliequivalents of (KBr—KbrO$_3$)—milliequivalents of thiosulfate.

The fluoride content of the paraffin and the desired alkyl benzene product was determined spectrophotometrically using the technique described in Analytical Chemistry, 36, 1821 (1964). Such method of analysis determines the fluoride content of the sample without distinguishing the type of fluoride present, that is, hydrogen fluoride, inorganic fluoride salts or organic fluorides.

In the following table, the results of various alkylations at different temperatures are tabulated with respect to the fluoride impurity content of the paraffins and the alkyl benzene product, and bromine number of the alkylbenzene product.

TABLE I

| Alkylation temperature (° C.) | Fluoride content of paraffins (p.p.m.) | Fluoride content of alkylbenzene (p.p.m.) | Bromine number of alkylbenzene |
|---|---|---|---|
| 6 | 5–10 | 10–30 | 0.13–0.25 |
| 10 | 3–5 | ------ | 0.10–0.25 |
| 35 | 1.0 | 3–5 | 0.05–0.10 |
| 50 | <1.0 | <1.0 | 0.02–0.04 |
| 55 | <1.0 | ------ | 9.02–0.04 |
| 60 | <1.0 | ------ | 0.01–0.02 |

The above data dramatically illustrates the reduction in the fluoride impurity content of the paraffins and the alkylbenzene products as well as the reduction in the bromine number of the alkylbenzene and, as can be observed therefrom, the fluoride content of the paraffins was reduced more than three fold, the fluoride content of the alkylbenzene product was reduced more than two fold, and the bromine number of the alkylbenzene product was reduced more than two fold by the use of elevated temperatures in the alkylation reaction as compared to conventional alkylation temperatures of 6 to 10° C. when using hydrogen fluoride as the alkylation catalyst.

What is claimed is:

1. In an alkylation process for reacting aromatic compounds with high molecular weight straight chain mono-olefins, contained in an alkylate precursor mixture containing high molecular weight straight chain paraffins and said mono-olefins, in the presence of substantially anhydrous hydrogen fluoride as the alkylation catalyst to form high molecular weight straight chain alkyl aryl compounds, the improvement which comprises carrying out the reaction under temperature conditions of from about 35° C. to about 65° C.

2. The process of claim 1, wherein said aromatic compounds are benzene compounds.

3. The method of claim 2, wherein said straight chain mono-olefins contain from about 10 to about 15 carbon atoms per molecule.

4. The method of claim 3, wherein said temperature conditions are from about 50° C. to about 60° C.

5. In the method wherein high molecular weight straight chain paraffins are catalytically dehydrogenated to form an alkylate precursor mixture containing high molecular weight straight chain mono-olefins and straight chain paraffins, and thereafter alkylating aromatic compounds with said mono-olefins in said alkylate precursor mixture in the presence of substantially anhydrous hydrogen fluoride as the catalyst to form high molecular weight straight chain alkyl aryl compounds, removing said paraffins from said alkyl aryl compounds and recycling said paraffins for use in the dehydrogenation reaction, and recovering said straight chain alkyl aryl compounds, the improvement comprising carrying out said alkylation reaction under temperature conditions of from about 35° C. to about 65° C. in order to reduce the fluoride impurity content of said recycle paraffins.

6. The method of claim 5, wherein said aromatic compounds are benzene compounds.

7. The method of claim 6, wherein said straight chain mono-olefins contain from about 10 to about 15 carbon atoms per molecule.

8. The method of claim 7, wherein said temperatures are from about 50 to about 60° C.

References Cited

UNITED STATES PATENTS

| | | | |
|---|---|---|---|
| 2,582,047 | 1/1952 | Lee | 260—671 |
| 2,645,672 | 7/1953 | Schluze | 260—671 |
| 2,943,118 | 6/1960 | Cahn et al. | 260—671 |
| 3,169,987 | 2/1965 | Bloch | 260—671 X |

DELBERT E. GANTZ, *Primary Examiner.*

C. R. DAVIS, *Assistant Examiner.*